(12) United States Patent
Lou et al.

(10) Patent No.: US 9,548,072 B2
(45) Date of Patent: Jan. 17, 2017

(54) CONCURRENT MODULATION AND FRICTIONAL HEATING HEAD DISK CONTACT DETECTION

(71) Applicant: Seagate Technology LLC, Cupertino, CA (US)

(72) Inventors: Huazhou Lou, Eden Prairie, MN (US); Jason Riddering, Prior Lake, MN (US); Shawn S. Silewski, Eden Prairie, MN (US); Dongming Liu, Eden Prairie, MN (US); Lin Zhou, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/619,769

(22) Filed: Feb. 11, 2015

(65) Prior Publication Data
US 2016/0232931 A1    Aug. 11, 2016

(51) Int. Cl.
G11B 11/00 (2006.01)
G11B 5/60 (2006.01)
G11B 5/31 (2006.01)
G11B 5/00 (2006.01)
G11B 7/00 (2006.01)
G11B 11/105 (2006.01)

(52) U.S. Cl.
CPC ............ *G11B 5/6076* (2013.01); *G11B 5/314* (2013.01); *G11B 5/607* (2013.01); *G11B 5/6017* (2013.01); *G11B 5/6088* (2013.01); *G11B 7/00* (2013.01); *G11B 11/1058* (2013.01); *G11B 11/10558* (2013.01); *G11B 2005/0021* (2013.01); *G11B 2220/2525* (2013.01)

(58) Field of Classification Search
USPC ............... 369/13.33, 13.13, 13.32, 13.17, 13.02,369/13.21; 360/59, 75
See application file for complete search history.

(56) References Cited

U.S. PATENT DOCUMENTS

| | | | |
|---|---|---|---|
| 6,396,783 B1* | 5/2002 | Bell et al. | 369/53.18 |
| 7,616,398 B2 | 11/2009 | Gong | |
| 7,990,647 B2 | 8/2011 | Lille | |
| 8,416,650 B2 | 4/2013 | Mori et al. | |
| 8,638,349 B1* | 1/2014 | Liu et al. | 346/78 |
| 8,654,618 B1* | 2/2014 | Liu et al. | 369/13.33 |
| 8,743,667 B1 | 6/2014 | Brockie et al. | |
| 8,760,779 B2 | 6/2014 | Johns et al. | |
| 8,787,125 B1 | 7/2014 | Lee | |

(Continued)

OTHER PUBLICATIONS

May 16, 2016 File History for U.S. Appl. No. 14/619,795, 69 pages.

(Continued)

*Primary Examiner* — Tan X Dinh
(74) *Attorney, Agent, or Firm* — Hollingsworth Davis, LLC (57) ABSTRACT

An apparatus comprises a heat-assisted magnetic recording (HAMR) head, a sensor, and a controller. The HAMR head is configured to interact with a magnetic storage medium. The sensor is configured to produce a signal indicating the occurrence of head-medium contact. The controller is configured to receive the signal and concurrently determine from the signal if the occurrence of head-medium contact is caused by a first contact detection parameter, a second contact detection parameter, or both the first and second contact detection parameters.

18 Claims, 5 Drawing Sheets

(56) References Cited

U.S. PATENT DOCUMENTS

| | | |
|---|---|---|
| 8,804,272 B1 | 8/2014 | Dakroub et al. |
| 8,804,273 B1 * | 8/2014 | Camalig et al. |
| 8,837,070 B1 * | 9/2014 | Johnson ............... G11B 5/6017 360/39 |
| 8,837,071 B2 | 9/2014 | Macken et al. |
| 8,867,323 B2 | 10/2014 | Andruet et al. |
| 8,873,350 B2 | 10/2014 | Rausch et al. |
| 8,873,353 B1 | 10/2014 | Riddering |
| 8,902,718 B1 | 12/2014 | Ruan et al. |
| 8,922,929 B1 | 12/2014 | Ruan et al. |
| 8,937,853 B2 | 1/2015 | Zheng et al. |
| 9,019,646 B2 | 4/2015 | Rausch et al. |
| 9,030,773 B2 | 5/2015 | Macken et al. |
| 2006/0139789 A1 | 6/2006 | Yang |
| 2008/0072692 A1 | 3/2008 | Uji et al. |
| 2009/0268330 A1 | 10/2009 | Lee et al. |
| 2013/0091695 A1 | 4/2013 | Shimazawa et al. |
| 2013/0286802 A1 * | 10/2013 | Kiely ......................... 369/13.31 |
| 2013/0286805 A1 * | 10/2013 | Macken et al. ............ 369/13.33 |
| 2013/0286807 A1 | 10/2013 | Gao et al. |
| 2014/0009851 A1 * | 1/2014 | Budde ........................ 369/13.33 |
| 2014/0023108 A1 * | 1/2014 | Johnson et al. ................ 374/45 |
| 2014/0029396 A1 | 1/2014 | Rausch et al. |
| 2014/0269238 A1 | 9/2014 | Kautzky et al. |
| 2014/0269819 A1 | 9/2014 | Kiely et al. |
| 2014/0334275 A1 | 11/2014 | Zheng et al. |
| 2015/0003219 A1 | 1/2015 | Isokawa et al. |
| 2015/0003223 A1 | 1/2015 | Macken et al. |
| 2015/0109892 A1 * | 4/2015 | Contreras et al. ......... 369/13.26 |

OTHER PUBLICATIONS

International Search Report and Written Opinion dated Jul. 20, 2016 for PCT Application No. PCT/US2016/017241, 12 pages.

* cited by examiner

CONCURRENT MODULATION AND FRICTIONAL HEATING HEAD DISK CONTACT DETECTION

SUMMARY

An apparatus of the present disclosure comprises a heat-assisted magnetic recording (HAMR) head, a sensor, and a controller. The HAMR head is configured to interact with a magnetic storage medium. The sensor is configured to produce a signal indicating the occurrence of head-medium contact. The controller is configured to receive the signal and concurrently determine from the signal if the occurrence of head-medium contact is caused by a first contact detection parameter, a second contact detection parameter, or both the first and second contact detection parameters.

A method of the present disclosure comprises performing an AC sampling of a signal produced by a sensor of a heat-assisted magnetic (HAMR) head, wherein the HAMR head is configured to interact with a magnetic storage medium and performing a DC sampling of a signal produced by the sensor of the (HAMR) head. The method further comprises concurrently determining from both the AC and DC sampling of the signal whether a first contact detection parameter, a second contact detection parameter, or both the first and second contact parameter indicate a head-medium contact event.

An apparatus of the present disclosure comprises a recording head, a sensor and a controller. The recording head is configured to interact with a magnetic storage medium. The sensor is configured to produce a signal indicating the occurrence of head-medium contact. The controller is configured to receive the signal and to concurrently determine from the signal if the occurrence of head-medium contact is caused by contact modulation, contact frictional heating, or both contact modulation and contact frictional heating.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to detection and control of head-media spacing in data storage devices. The detection of head-to-media spacing becomes more challenging in what are referred to as heat-assisted magnetic recording (HAMR) devices. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

Generally, HAMR recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. In HAMR, a number of other components near the read and write transducers may contribute to thermal protrusion. This can make the estimation and control of head-to-media spacing more difficult in a HAMR recording head.

Figure 1:
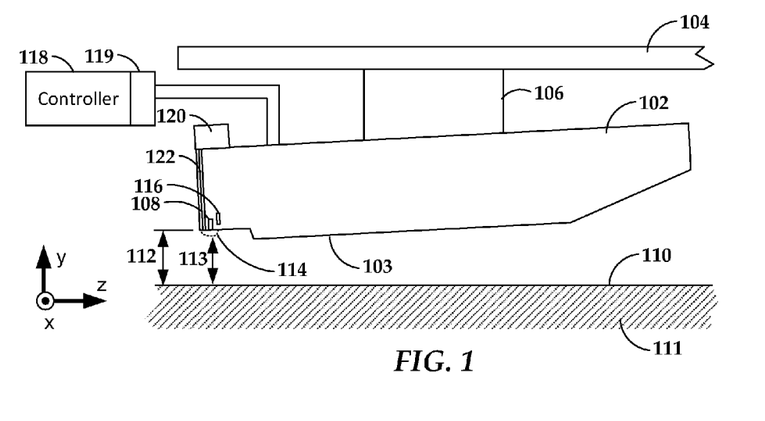
FIG. 1 is a block diagram of a heat-assisted magnetic recording (HAMR) head and media arrangement according to an example embodiment.

In reference now to FIG. 1, a block diagram shows a side view of a recording head 102 according to an example embodiment. The recording head 102 may also be referred to herein as a slider, read head, read/write head, head, etc. The recording head 102 is coupled to an arm 104 by way of a suspension 106 that allows some relative motion between the recording head 102 and arm 104. The recording head 102 includes read/write transducers 108 at a trailing edge that are held proximate to a surface 110 of a magnetic recording medium 111, e.g., magnetic disk. When the recording head 102 is located over surface 110 of recording medium 111, a flying height 112 is maintained between the recording head 102 and the surface 110 by a downward force of arm 104. This downward force is counterbalanced by an air cushion that exists between the surface 110 and an air bearing surface (ABS) 103 (also referred to herein as a "media-facing surface") of the recording head 102 when the recording medium 111 is rotating.

It is desirable to maintain a predetermined slider flying height 112 over a range of disk rotational speeds during both reading and writing operations to ensure consistent performance. Region 114 is a "close point" of the recording head 102, which is generally understood to be the closest point of contact between the read/write transducers 108 and the magnetic recording medium 111, and generally defines the head-to-media spacing 113. To account for both static and dynamic variations that may affect slider flying height 112, the recording head 102 may be configured such that a region 114 of the recording head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over dynamic/effective head-to-media spacing 113 via heat, the recording head 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the recording head 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the recording head 102 and other components not shown.

Other elements of the recording head 102 may also provide heat besides or in addition to the heating element 116. For example, a write coil of the read/write transducers 108 may generate sufficient heat to cause configurable deformation of region 114. This deformation will only occur when the coil is energized, e.g., when data is being written. Further, additional components within or near the HAMR recording head may generate heat near the read/write transducer 108. These heat-generating components include laser 120 (or other energy source) and waveguide 122. The waveguide 122 delivers light from the laser 120 to components near the read/write transducers 108. These components are shown in greater detail in FIG. 2.

Figure 2:
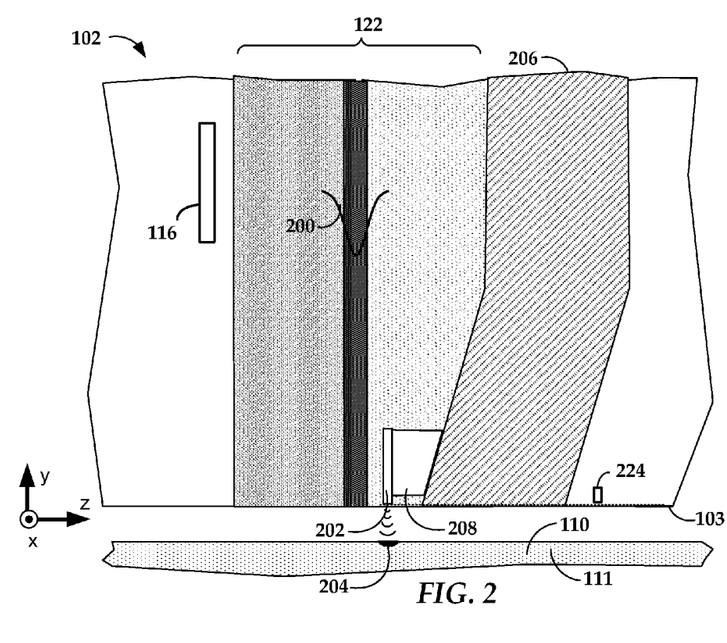
FIG. 2 is a cross-sectional view of a HAMR head according to an example embodiment.

In FIG. 2, a block diagram illustrates a cross-sectional view of the read/write head 102 according to an example embodiment. The waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The recording head 102 additionally includes the heating element (heater) 116 that may be used to adjust the protrusion of the NFT 202, a read transducer (not shown) and a sensor 224. The sensor 224 may be used for various purposes as will be described further below and, in the instance of the present disclosure, may be a temperature coefficient of resistance (TCR) type sensor, for example, a dual-ended TCR (DETCR). The recording head 102 further includes a heat sink 208 that is thermally coupled to the NFT 202; the heat sink 208 may be used to draw heat away, e.g., to the write pole 206 or other nearby heat-conductive components, as the heat at the hotspot 204 increases.

Figure 3:
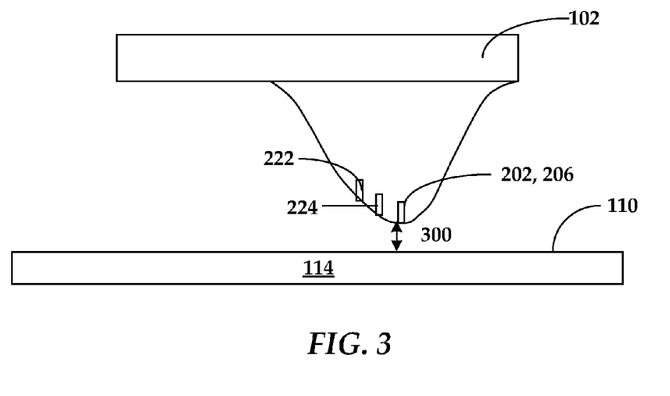
FIG. 3 is a block diagram illustrating protrusion of a HAMR recording head.

As shown in FIG. 3, as the temperature within the recording head 102 increases the area of the head 102 containing, for example, the NFT 202 and write pole 206, reader 222 and the sensor 224, protrudes towards the surface 110 of the medium 114. To achieve desired reliability and write performance of the head 102, an optimal clearance height 300 may be established between the protruded head 102 and the surface 110. Once the clearance height 300 is established, the controller 118 operates in conjunction with the various components of the recording head 102 to maintain the clearance height 300 during read/write operations through adjustment of the protrusion. The optimal clearance height 300 may be established through a contact detection scheme. However, contact detection can be challenging with HAMR due to high fly heights, narrow transducer protrusion shape, low contact modulation, and vibration.

Thus, the present disclosure provides for a contact detection scheme that concurrently utilizes two contact detection parameters to indicate head-medium contact, e.g., a head-medium interface event. A first of two contact detection parameters include a measure of vibration, such as contact modulation. A second of the contact detection parameters include a thermal parameter, such as contact frictional heating. Depending on the head design, such as protrusion geometry, air bearing pressure, disk surface properties, etc., both or only one of the contact detection parameters may occur upon actual contact. The concurrent monitoring of both contact parameters ensures that at least one of the parameters detects head-to-media contact.

Figure 4:
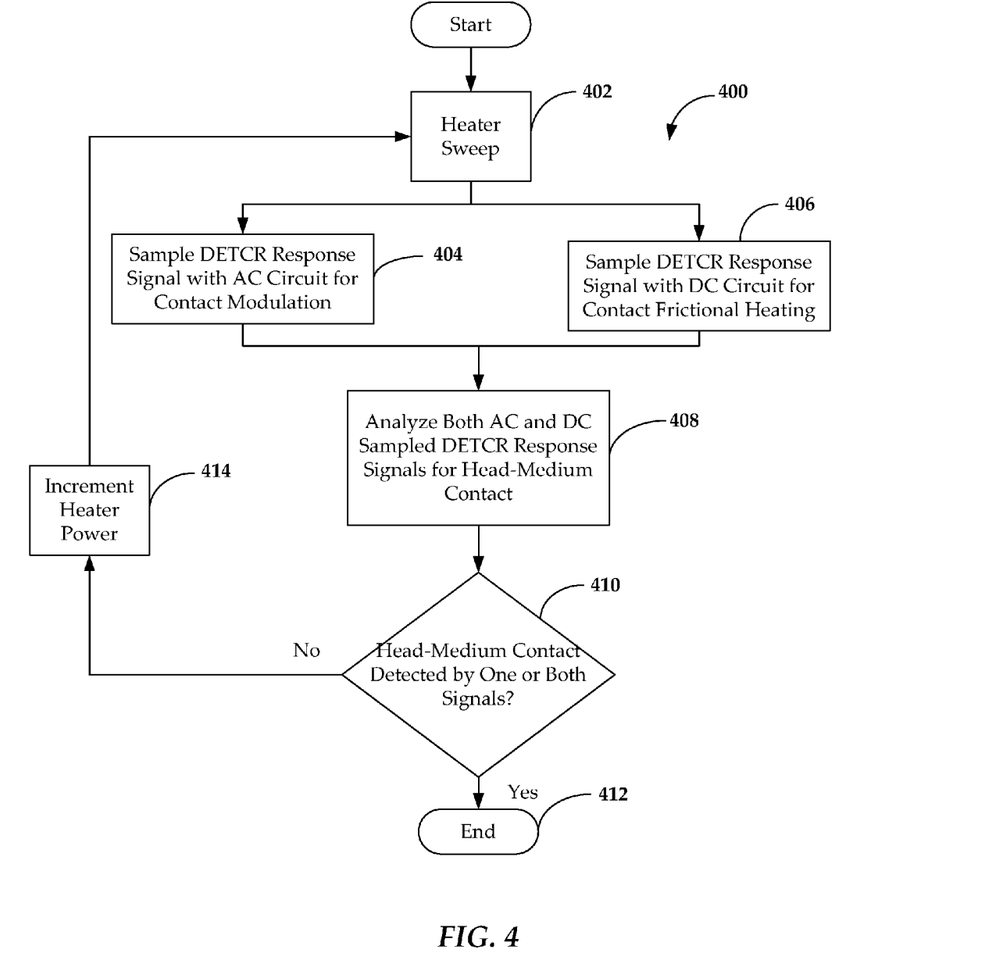
FIG. 4 is flowchart illustrating a method according to an example embodiment.

An example embodiment of a process 400 for contact detection using concurrent monitoring of contact modulation and contact frictional heating is illustrated in the flowchart of FIG. 4. For the purposes of this embodiment, the sensor used within the process is a DETCR sensor. As shown, the process provides for initiation of a heater sweep 402 and a dual sampling of the DETCR response signal. The DETCR response signal is first sampled 404 for contact modulation with an AC DETCR circuit, together with other conventional detectors, at steady state power. The DETCR response signal is subsequently sampled 406 for contact frictional heating with a DC DETCR circuit at a mean heater power plus/minus an oscillation amplitude. Both the AC and DC DETCR signals are then analyzed concurrently for contact detection 408. If either the AC and/or the DC DETCR signals indicate head-medium contact, contact is declared and further contact detection attempts are ended 412. If neither of the AC or DC DETCR signals indicates head-medium contact, the heater power is incremented 414 and the process 400 repeats until head-medium contact is established. Further details of the process 400 are provided below.

Figure 9A:
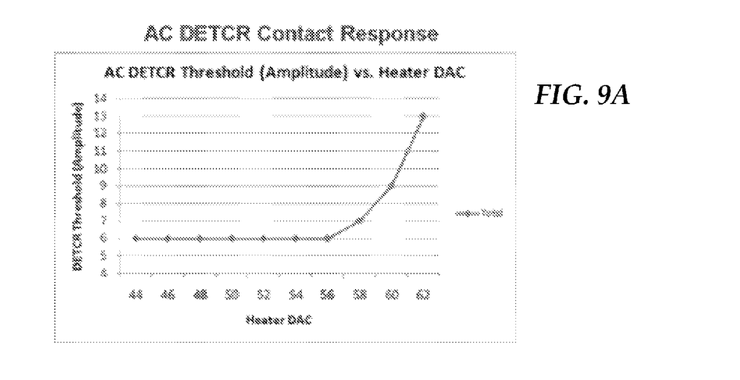
FIGS. 9A-9B are graphs illustrating head-medium contact detection with contact modulation and contact frictional heating, respectively, according to an example embodiment.

Head-medium contact detection via contact modulation measurements uses the DETCR AC response signal and an AC amplification circuit that amplifies the response signal. The AC signal amplitude is measured at different levels of heater actuation, through incrementing of the heater power level (see 414 of FIG. 4), until contact modulation is detected (and/or contact frictional heating is detected with the DC DETCR circuit). When contact modulation is present, the AC DETCR signal amplitude has a sudden jump (avalanche) at the onset of contact indicating the head-medium contact. FIG. 9A shows an example of a sudden jump in AC DETCR signal amplitude and is described further below. An apparatus using this type of detection can store each amplitude reading and compare the current amplitude to one or more previous amplitudes to determine if a jump occurs indicating head-medium contact. Other ways of detecting the jump may be used, e.g., by tracking the slope of the AC amplitude curve. The heater power resulting in the jump can be stored as a current heater power that induces head medium contact.

It should be noted that other modulation based detectors may be used in combination with the detectors described above. These other detectors may, for example, include servo the Position Error Signal (PES) and the Automatic Gain Control (AGC) signal. PES and AGC may be used concurrently with AC DETCR and DC DETCR detectors. The PES detector measures head lateral modulation motion.

During a heater sweep, while measuring the PES signal, if the PES signal has a rapid deviation from a non-contact trend, head medium contact is detected. The AGC detector measures head vertical modulation motion. During a heater sweep, while measuring the AGC signal, if the AGC signal has a rapid deviation from the non-contact AGC signal trend, head medium contact is detected.

Head-medium contact detection by contact frictional heating is detected through use of the DETCR response signal and a DC amplification circuit that enables measurement of the DETCR resistance. The DC DETCR resistance is measured at different heater power levels through incrementing of the heater power level (see 414 of FIG. 4). However, the DC DETCR resistance measurement requires more in-depth analysis to determine head-medium contact than the amplitude analysis of the AC DETCR signal.

Figure 5:
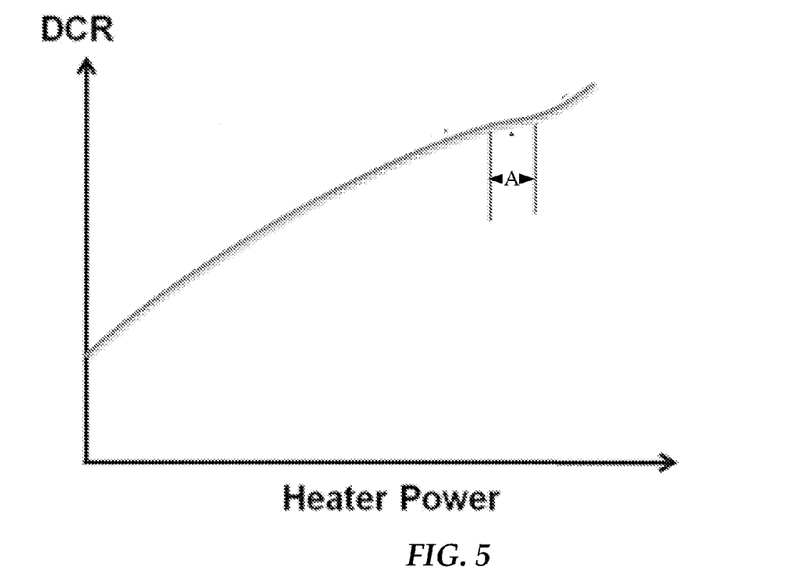
FIG. 5 is graph of a DC sensor resistance and heater power according to an example embodiment.

FIG. 5, a graph illustrates an example of DC DETCR resistance (DCR) response versus heater power. As shown the, DCR increases as the heater power increases and the protrusion of the HAMR recording head reaches closer to the surface of the recording medium. However, the slope begins to shallow as the head protrusion nears the surface of the disk such that the some of the recording head heat is transferred to the disk and, thereby, a subtle cooling of the head occurs. The most significant cooling of the head, and the most shallow portion of the slope, occurs when the head actually starts to contact the disk; the reduced slope is noted as item A in FIG. 5. Beyond the initial head-medium contact, frictional heating from head-medium contact causes the DCR to once again rise. As such, head-medium contact is detected at the slope change of the DCR curve.

Figure 6:
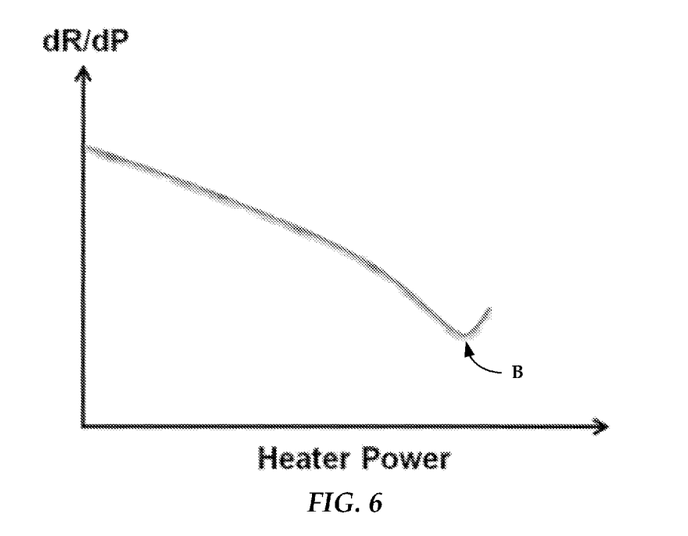
FIG. 6 is a graph showing the derivative of the graph of FIG. 5.

To identify the slope change, the derivative of the DCR curve is produced as shown in FIG. 6. The derivative of the DCR curve is the dR/dP slope curve and the minimum on the dR/dP slope curve, at item B, may be deemed the head-medium contact event. An apparatus utilizing frictional heating detector may comparing a current dR/dP value to the dR/dP at the last power value to determine if the slope is once again rising. If dR/dP begins rising, this signals that contact has occurred at the current power level. Other methods may be used to detect this inflection point, e.g., change in sign of $d^2R/dP^2$ versus heater power.

Figure 7A:
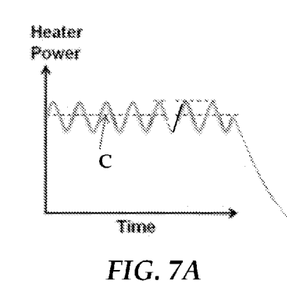
FIGS. 7A-7C are graphs illustrating a relative DC sensor resistance measurement according to an example embodiment.
Figure 7B:
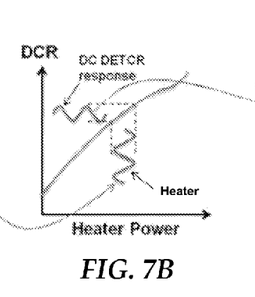
Figure 7C:
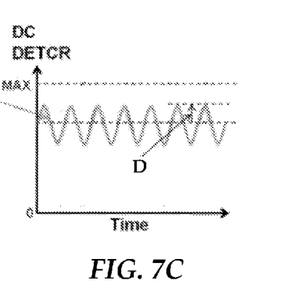

Accurately measuring the DCR curve to produce an accurate dR/dP slope curve can be difficult in a drive environment as the drive amplifier may not have enough resolution and range to achieve the desired accuracy. As such, a relative DCR measurement method may be used to measure the dR/dP slope directly. The relative DCR measurement method involves oscillating the heater power in a small range, with fixed amplitude, around a mean value C as illustrated in the graph of FIG. 7A; the oscillating signal may be a sine wave or other appropriate waveform. The DCR waveform is then measured while the heater power is oscillated as illustrated in the graph of FIG. 7B. Because the heater oscillation range is small, the DCR range is also small. As such, a very high gain can be applied to amplify the delta DCR change to obtain the desired high resolution measurement. The measured DCR waveform is then processed with a lock-in algorithm to extract the DCR signal that corresponds to the frequency of heater oscillation as illustrated in the graph of FIG. 7C. The lock-in extracted amplitude, identified with the letter D in FIG. 7C, is the direct measurement of the dR/dP slope.

Besides the DCR amplitude, the DCR waveform phase relative to the actuation heater oscillation waveform is also extracted with the lock-in algorithm. The phase signal versus heater power alone can be used as an independent detector. When the phase signal has a sudden deviation from its trend, contact is detected. The phase signal can also be combined with the lock-in extracted DCR amplitude to produce phase compensated amplitude for better accuracy. Phase compensated amplitude=DCR amplitude*cosine(delta Phase from start heater power).

Figure 8A:
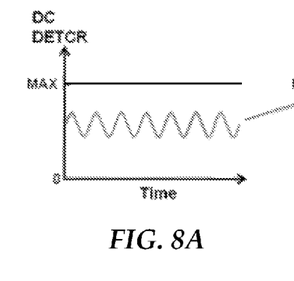
FIGS. 8A-8C are graphs illustrating the use of a DC offset according to an example embodiment.
Figure 8B:
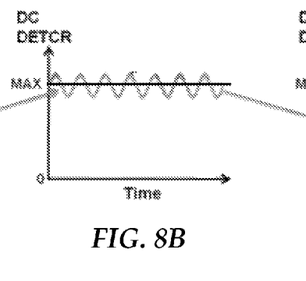
Figure 8C:
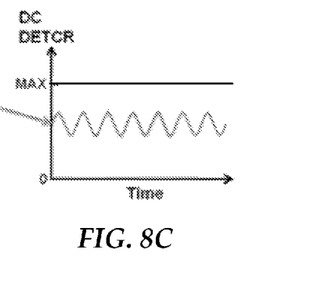

Note that to assist in overcoming the amplifier limitation of range and resolution, a DC offset cancellation algorithm may be implemented. The DC offset cancellation algorithm adaptively adjusts the amplifier DC offset cancellation voltage to center the oscillated DCR signal in the amplifier usable range. The DC offset cancellation algorithm is illustrated in FIGS. 8A-8C. FIG. 8A illustrates the preamplifier measured DCR signal when the signal is within a the preamplifier range. However, as the heater power increases, the mean heater power also increases pushing the preamplifier measured DCR signal, which is centered around the mean heater power, outside a usable preamplifier range, see FIG. 8B. A DC offset voltage is then provided to the DC DETCR preamplifier to bring the measured DCR signal back into a usable range, see FIG. 8C.

Figure 9B:
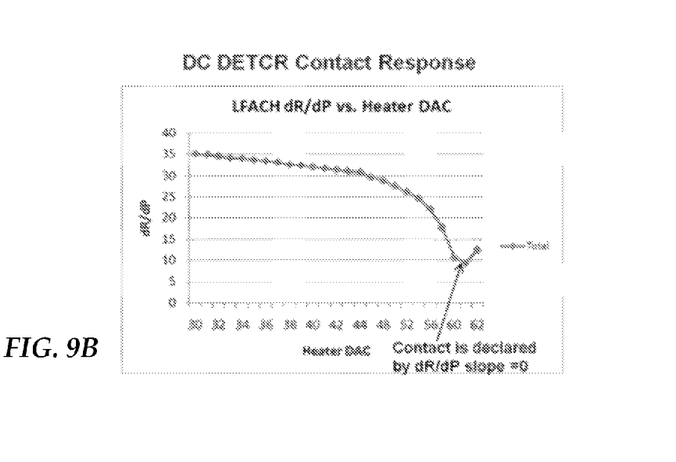

An example of the results that may be obtained by the process for contact detection using concurrent monitoring of contact modulation and contact friction heating are illustrated in the graphs of FIGS. 9A and 9B. In the example, the concurrent monitoring established head-medium contact with both parameters. FIG. 9A illustrates the example result of detecting head-medium contact through contact modulation by sampling the DETCR response signal with an AC circuit as described above. As shown, the AC signal has a sudden jump, or avalanche, in amplitude, indicating contact at approximately 60-61 heater DAC. FIG. 9B illustrates the example result of detecting head-medium contact through contact friction heating by sampling the DETCR response signal with a DC circuit as described above. As shown, the DC signal has a dR/dP slope of zero, indicating contact, at approximately 60 heater DAC.

Once contact detection is established, the heater power at which zero head-medium clearance is established. The head will be operated at contact heater power minus a back off power to maintain a constant clearance.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
a controller configured to be coupled to a magnetic recording head configured to interact with a magnetic storage medium, the head comprising a sensor configured to produce a signal indicating the occurrence of head-medium contact, the controller configured to:
sample, from the signal, a vibration parameter using a first sampling type and a thermal parameter using a second sampling type different from the first sampling type;
analyze both parameters for an indication of head-medium contact; and
determine occurrence of head-medium contact in response to at least one of the vibration and thermal parameters indicating head-medium contact, wherein determination of the occurrence of head-medium contact indicated by the vibration parameter is based on an amplitude of an AC sampling of the signal.

2. The apparatus of claim 1, wherein the vibration parameter comprises contact modulation and wherein the thermal parameter comprises contact frictional heating.

3. The apparatus of claim 1, wherein the determination of the occurrence of head-medium contact indicated by the thermal parameter is based on a resistance of the sensor measured through a DC sampling of the signal.

4. The apparatus of claim 3, wherein the resistance comprises a relative resistance.

5. The apparatus of claim 3, wherein the DC sampling of the signal is phase compensated.

6. The apparatus of claim 1, further comprising a heater and wherein the controller is configured to iteratively increase a power of the heater until the sensor produces the signal indicating the occurrence of head-medium contact.

7. A method comprising:
performing an AC sampling of a signal produced by a sensor of a magnetic head to obtain a first contact detection parameter, wherein the head is configured to interact with a magnetic storage medium;
performing a DC sampling of the signal produced by the sensor to obtain a second contact detection parameter;
analyzing the first and second contact detection parameters for an indication of head-medium contact; and
determining head-medium contact from both the AC and DC sampling of the signal in response to the first contact detection parameter, the second contact detection parameter, or both the first and second contact detection parameters indicating a head-medium contact event.

8. The method of claim 7, wherein the first contact detection parameter comprises contact modulation and wherein the second contact detection parameter comprises contact frictional heating.

9. The method of claim 8, wherein contact modulation indicating head-medium contact is based on an amplitude of the AC sampling of the signal.

10. The method of claim 8, wherein contact frictional heating indicating head-medium contact is based on a resistance of the sensor measured through the DC sampling of the signal.

11. The method of claim 10, wherein the resistance is a relative resistance.

12. The method of claim 10, wherein the DC sampling of the signal is phase compensated.

13. The method of claim 7, further comprising iteratively increasing the power of a heater until the head-medium contact event occurs.

14. An apparatus comprising:
a controller configured to receive a signal from a sensor of a magnetic recording head, the sensor configured to produce a signal indicating the occurrence of head-medium contact, the controller further configured to:
concurrently detect, from the signal, contact modulation using a first detection method and contact frictional heating using a second detection method different from the first detection method;
analyze both the contact modulation and contact frictional heating for an indication of head-medium contact; and
determine occurrence of head-medium contact in response to one or both of the contact modulation and the contact frictional heating indicating head-medium contact wherein determination of the occurrence of head-medium contact indicated by contact modulation is based on an amplitude of an AC sampling of the signal.

15. The apparatus of claim 14, wherein the determination of the occurrence of head-medium contact indicated by contact frictional heating is based on a resistance of the sensor measured through a DC sampling of the signal.

16. The apparatus of claim 15, wherein the resistance comprises a relative resistance.

17. The apparatus of claim 15, wherein the DC sampling of the signal is phase compensated.

18. The apparatus of claim 14, further comprising a heater and wherein the controller is configured to iteratively increase a power of the heater until the sensor produces the signal indicating the occurrence of head-medium contact.

* * * * *